H. D. OLSON.
TRAFFIC SIGNAL.
APPLICATION FILED OCT. 29, 1919.

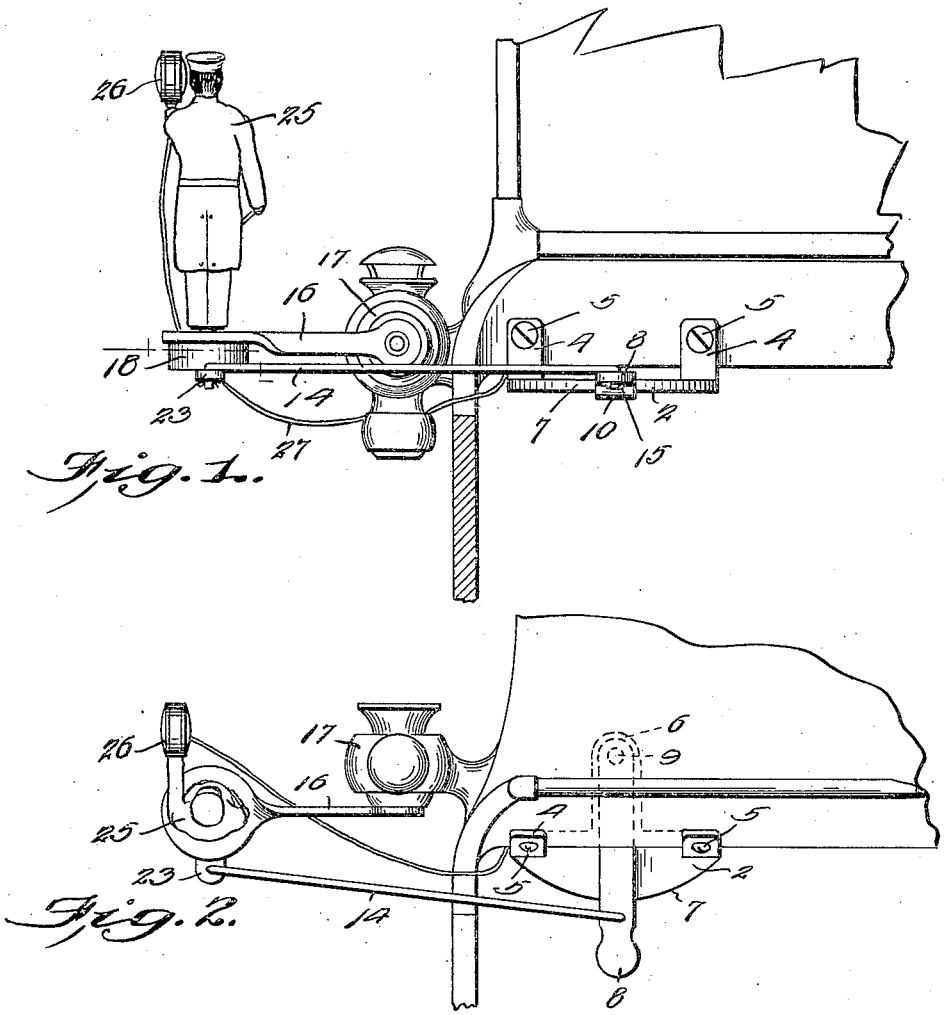

1,371,928.

Patented Mar. 15, 1921.
2 SHEETS—SHEET 2.

Witness

Inventor
Henry D Olson
By Edwin S Clarkson
Attorney

UNITED STATES PATENT OFFICE.

HENRY D. OLSON, OF OMAHA, NEBRASKA.

TRAFFIC-SIGNAL.

1,371,928.  Specification of Letters Patent.  Patented Mar. 15, 1921.

Application filed October 29, 1919. Serial No. 334,106.

*To all whom it may concern:*

Be it known that I, HENRY D. OLSON, a citizen of the United States, residing at Omaha, in the county of Douglas, and State of Nebraska, have invented certain new and useful Improvements in Traffic-Signals, of which the following is a specification.

My invention relates to traffic signals to be used on automobiles, and is especially adapted to some part of the forward end of the car, such for instance, as the wind shield structure.

My invention, in its preferred form embodies a manikin holding a signal, such as a light, adapted to be operated by the driver of the automobile to indicate the direction in which he intends to travel.

In the drawing,

Figure 1 is a rear elevation of my invention attached to an automobile.

Fig. 2 is a top plan view of the same.

Fig. 6 is a detail sectional view.

Figure 3:
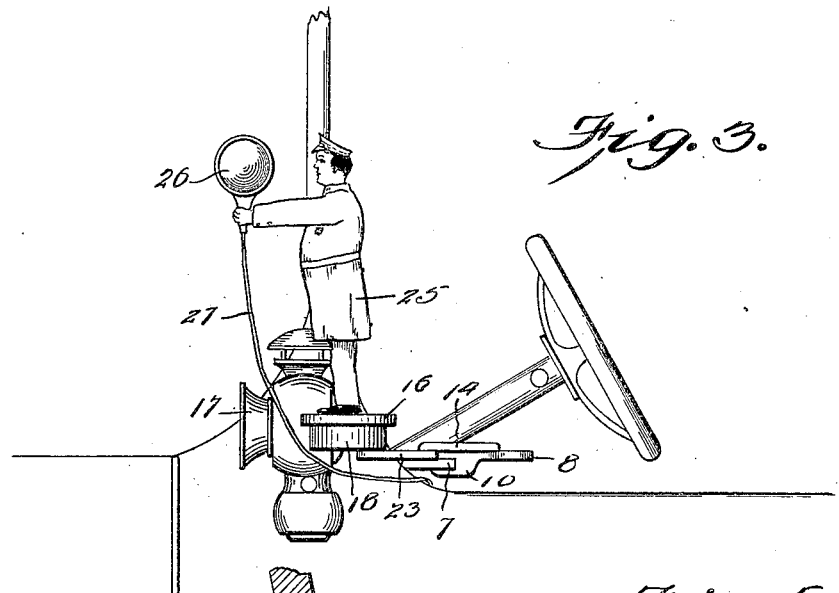
Fig. 3 is a side elevation of Fig. 1.
Figure 5:
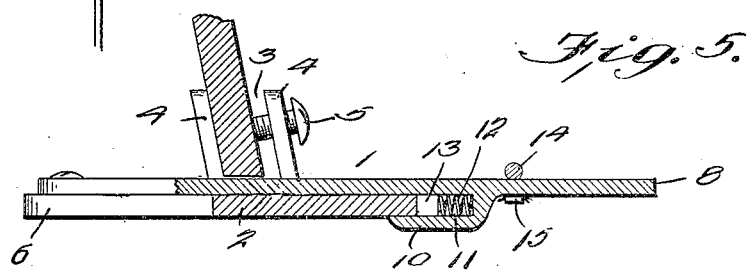
Fig. 5 is a longitudinal vertical section of Fig. 4.
Figure 4:
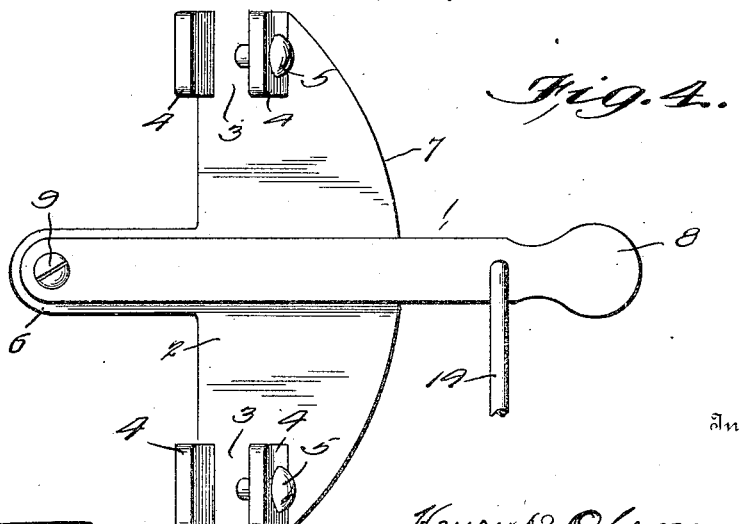
Fig. 4 is a top plan detail view.

The reference numeral 1 designates a wind shield structure, to which is secured a bracket comprising a plate 2 having sockets 3 formed between lugs 4 in which is a set screw 5 adapted to securely clamp the bracket to the wind shield structure. This plate is provided on one edge with an arm 6 and on the opposite edge with a flange 7 having a convex edge as shown in the drawing. An operating lever 8 is pivotally secured at 9 to the arm 6 of the plate 2 and projects materially beyond the convex edge of the plate and is provided with a depending undercut lug 10; the undercut being adapted to receive the convex edge of the plate. There is a recess 11 in the lug 10 extending rearwardly from the undercut in which is mounted a coiled spring 12 and a friction clutch 13 the outer end of which is held in friction engagement with the convex edge of the plate 2 whereby the lever 8 is securely held in any adjusted position relative to the plate 2.

A connecting link 14 is pivotally connected at 15 to the lever 8 at its inner end.

A bracket 16 is secured to one of the side lamps 17, or other part of an automobile and has at its outer end a gear housing 18, in which is journaled a shaft 19 on which is keyed a pinion 20 which meshes with a pinion 21 keyed on a stub shaft 22 which projects through the bottom of the gear housing 18. 23 is a lever keyed to the stub shaft 22 to the outer end of which the outer end of the link 14 is pivotally secured as at 24.

The shaft 19 projects through the top of the housing 18 and a manikin 25 is keyed thereon so that it will revolve therewith. One arm of the manikin is in forwardly extended position and supports a suitable lamp 26, the front and rear sides thereof showing a clear white light, while the sides show a red light. Preferably the light is furnished from a suitable source of electric current to which the wires 27 are connected.

In straight ahead travel the lever 8 is in neutral position midway between the ends of the convex edge of the plate 2. If a right hand turn is to be made by the vehicle, the lever 8 is moved to the right which, through the link 14 and gearing 20, 21 will revolve the manikin so that the extended arm will point to the right and a red light will show indicating the intention of the operator to make a right hand turn. For a left hand turn the lever 8 is moved toward the left thereby pointing the arm of the manikin toward the left.

The signal can be used with equal efficiency during the day as well as in the night.

What I claim is:

In a traffic signal a clamping plate adapted to be secured to a part of an automobile; said clamp plate comprising a flat member, lugs extending upward from the plate and provided with clamp screws, a convex friction braking edge on said plate, an operating lever pivotally mounted on said plate, an undercut lug depending from said lever and constructed to receive the convex edge of the plate, a resiliently mounted friction brake in said lug adapted to coöperate with said convex edge to hold the lever in an adjusted position, a signal, and an operable connection between said signal and operating lever.

In testimony whereof I affix my signature.

HENRY D. OLSON.